US010255683B1

(12) United States Patent
Gopal et al.

(10) Patent No.: US 10,255,683 B1
(45) Date of Patent: Apr. 9, 2019

(54) DISCONTINUITY DETECTION IN VIDEO DATA

(71) Applicant: Amazon Technologies, Inc., Seattle, WA (US)

(72) Inventors: Sharath Kumar Gopal, San Jose, CA (US); Rohith Mysore Vijaya Kumar, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/799,517

(22) Filed: Oct. 31, 2017

(51) Int. Cl.
| | |
|---|---|
| *G06T 7/223* | (2017.01) |
| *G06K 9/00* | (2006.01) |
| *G08B 13/196* | (2006.01) |
| *G06T 7/269* | (2017.01) |

(52) U.S. Cl.
CPC .......... *G06T 7/223* (2017.01); *G06K 9/00758* (2013.01); *G06K 9/00771* (2013.01); *G06T 7/269* (2017.01); *G08B 13/19602* (2013.01); *G06T 2207/10016* (2013.01); *G06T 2207/20021* (2013.01); *G06T 2207/30232* (2013.01)

(58) Field of Classification Search
CPC ...... G06T 7/223; G06T 7/269; G06T 2207/10016; G06T 2207/20021; G06T 2207/30232; G06K 9/00758; G06K 9/00771; G08B 13/19602
USPC ........................................................ 382/107
See application file for complete search history.

(56) References Cited

U.S. PATENT DOCUMENTS

| | | | |
|---|---|---|---|
| 7,260,148 B2 * | 8/2007 | Sohm ..................... | H04N 19/56 348/416.1 |
| 9,349,076 B1 * | 5/2016 | Liu ....................... | G06K 9/6256 |

\* cited by examiner

*Primary Examiner* — Jonathan S Lee
(74) *Attorney, Agent, or Firm* — K&L Gates LLP

(57) ABSTRACT

Techniques are generally described for discontinuity detection. A first and second frame of video data representing a portion of a physical environment are received. The first and second frames are divided into first and second blocks of pixels, respectively. A set of matching blocks are determined by matching each block of the first blocks with a corresponding block of the second blocks. A difference value is determined for each pair of matching blocks of the set of matching blocks. A mean difference value for the set of matching blocks. The mean difference value is convolved with a convolution kernel. A determination is made that a result of the convolving the mean difference value with the convolution kernel exceeds a mean threshold value. A determination is made that a discontinuity between the first frame and the second frame is not due to motion in the physical environment.

20 Claims, 10 Drawing Sheets

DISCONTINUITY DETECTION IN VIDEO DATA

BACKGROUND

Cameras and other image sensors may be used to capture images and/or videos of a physical environment, sometimes for surveillance or monitoring certain areas of interest. Some cameras include image sensors effective to detect light in both the visible and infrared (IR) spectrums, which enable the operation of those cameras in day and night modes. Image data generated by cameras may be processed to determine characteristics of the area of interest being recorded, such as for detecting motion or movement in the recorded areas.

DETAILED DESCRIPTION

Figure 1:
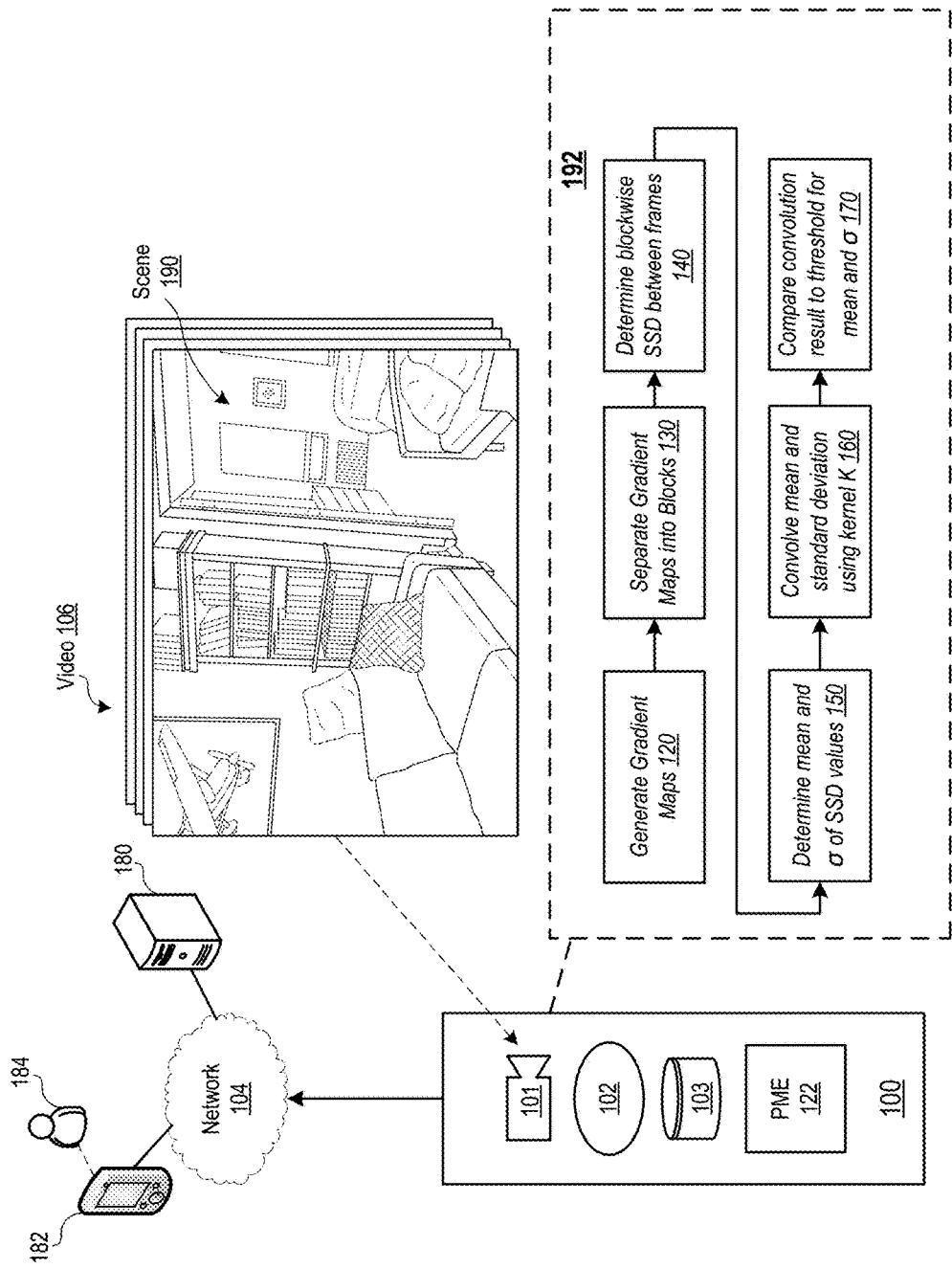
FIG. 1 is a system diagram showing an example system effective to perform discontinuity detection in video data, arranged in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for detecting discontinuity in video data between two or more frames of video data. In various examples, the techniques described herein may be effective to provide better motion detection by distinguishing between discontinuities occurring rapidly over the course of a few frames of image data (e.g., a light being turned on or a door suddenly opening) and discontinuities occurring relatively slowly over several frames of image data and indicating motion (e.g., a person walking across a room). Additionally, the techniques described herein may be able to distinguish between discontinuity in video data caused by changing lighting condition of a camera capturing the video (e.g., a change from day mode to night mode, a change from night mode to day mode and/or a change in infrared illumination levels and/or automatic exposure levels). Further, the techniques described herein may be able to distinguish between discontinuity in video data caused by decoder error and/or deteriorating network conditions (e.g., compression artifacts). Distinguishing between discontinuity in video data caused by motion within the scene (e.g., a person or animal moving in the scene) and discontinuity caused by the various other factors (e.g., those mentioned above, such as illumination changes, compression artifacts, etc.) may enable various systems to reduce or eliminate the false positive notifications, alerts, or other communications regarding detected motion produced as a result of the detected discontinuity. In some embodiments in which the image data corresponding to such scene changes or motion is transmitted over a network for processing by remote servers, this reduction in false positive communications can enable a reduction in network bandwidth consumption and remote processing resources. Furthermore, elimination of alerts generated due to illumination changes and/or compression artifacts may reduce the number of alerts transmitted to users, thereby eliminating false positive alerts related to non-motion events which are unlikely to be of much interest to the users. In some examples, a determination that a detected discontinuity has resulted from illumination changes and/or compression artifacts in accordance with the techniques described herein may cause the next segment of video (e.g., the next 150 ms (RGB) or 300 ms (IR)) to be skipped. A "skipped" segment or portion of the video may not be evaluated using the discontinuity detection techniques described herein. Further, in some examples, a determination that a detected discontinuity has resulted from illumination changes and/or compression artifacts in accordance with the techniques described herein may cause system 100 to reset a motion buffer.

In various examples, once the frames involved in a discontinuity are determined, this information may be used to modulate the sensitivity of various Computer Vision based detectors which detect objects and/or motion in the scene. For example, the temporal window over which the confidence is accumulated for motion detection could be doubled or otherwise increased, with a corresponding increase of a detection threshold to obtain enough frame data across the discontinuity. Object detector thresholds for frames corresponding to discontinuity may be toggled to a higher precision setting from their default values, with corresponding increases in minimum detection sizes to prevent spurious detections. If the discontinuity is attributed to transition of the sensor between different modes (e.g., RGB to IR), then models fine-tuned for both the settings could be run simultaneously for a small period and their results accumulated to prevent missed detections. Once the discontinuity has passed, sensitivity values of detectors may be reset to default.

Image data, as described herein, may refer to stand-alone frames of image data or to multiple frames of sequential image data, appended together to form a video. Video data, as described herein, may refer to sequential frames of image data. Frames of image data may be comprised of a plurality of pixels arranged in a two-dimensional grid including an x component representing a horizontal direction in the grid and a y component representing a vertical direction in the grid. A pixel is an addressable unit of image data in a frame. A particular pixel may be identified by an x value, representing the horizontal position of the pixel in the two-dimensional grid and a y value, representing the vertical position of the pixel in the two-dimensional grid. Additionally, blocks, as described herein, may refer to blocks of pixels. For example, a frame of image data may be conceptually separated into a number of rectangular blocks of pixels (sometimes referred to as "macroblocks"). In various examples, blocks may comprise 8 rows and 8 columns of pixels (e.g., 8×8). In some other examples, blocks may comprise 16 rows and 16 columns of pixels (e.g., 16×16). In addition to the foregoing examples, blocks may have different dimensions apart from those specifically listed herein. A scene, as referred to herein, may refer to a portion of a physical environment represented that may be represented in the image data of a frame.

FIG. 1 is a diagram showing an example system 100, arranged in accordance with various aspects of the present disclosure. In various examples, system 100 may comprise a camera 101, one or more processing elements 102, and a memory 103. In some further examples, system 100 may include a premotion estimator (PME) 122. In some embodiments, the system 100 can be utilized for surveillance or indoor monitoring. In various examples, one or more of the image processing techniques described herein may be performed by a processing element 102 included within a housing of system 100, which may be positioned at the location where the images are being acquired by the camera 101. In other examples, one or more of the image processing techniques described herein may be performed by a computing device accessible via a communications network, such as computing device 180 accessible over network 104. Accordingly, as depicted in FIG. 1, in some examples, system 100 may send image data over network 104 to one or more computing devices 180 for image processing. In other examples, system 100 may comprise one or more processors and/or a memory effective to perform the various image processing techniques described herein. In various examples, the techniques described herein may be used to determine whether or not to send an alert to user device 182 associated with user 184. In various examples, an alert may indicate that possible motion has been detected in scene 190. In some other examples, the techniques described herein may be used to determine whether or not to send image data over network 104 to one or more computing devices 180 for further processing and/or to user device 182.

In various examples, computing devices 180 may perform action recognition image processing, human detection, pet detection, and/or other image processing techniques. Additionally, in at least some examples, computing devices 180 may be effective to perform the various discontinuity detection techniques described herein. In some other examples, system 100 may perform the various discontinuity detection techniques described herein. In various other examples, some or all of the discontinuity detection techniques described herein may be performed by some combination of system 100 and computing devices 180. Accordingly, as described in further detail below, the various techniques described herein may conserve bandwidth and selectively reduce the amount of image data streamed to remote computing devices 180 for remote processing. Additionally, the various techniques described herein may be able to distinguish between scene changes of interest and/or significant motion within a scene 190 representing a physical environment and trivial changes within the scene, such as those caused by an illumination change or a compression artifact. In, for example, an indoor monitoring context, distinguishing between motion in the monitored physical environment and scene discontinuity caused by lighting changes and other non-motion events may improve the user experience by providing notifications and/or alerts to the user only when significant motion is detected in scene 190. In various examples, alerts and/or video data sent to user device 182 may be limited to those events reflecting non-trivial discontinuity in the scene (e.g., significant motion with scene 190). Additionally, in at least some examples, if a determination is made that a discontinuity results from an illumination change or compression artifact, the next segment of video (e.g., 100 ms-300 ms) may be skipped or otherwise not evaluated for purposes of detecting discontinuity. Additionally, in some examples, process flow 192, described in further detail below, may be used to gate video data prior to sending the video data to a motion detection module and/or human detection module. For example, if a discontinuity detected in 5 frames of image data is attributable to a lighting change, the 5 frames of image data may not be sent to the motion detection module and/or human detection module for further image processing.

Video of scene changes and/or significant motion may be streamed to one or more remote computing devices 180 and may be available for viewing by user 184. In various examples, video may be made available to user 184 through a companion application to system 100 and/or through a browser-based system. Additionally, according to the various techniques described herein, scene discontinuity determined to be due to illumination changes and/or compression artifacts may be disregarded and may not trigger system 100 and/or computing devices 180 to stream video to remote computing devices, further conserving bandwidth and/or remote processing resources.

Network 104 may be, for example, the internet, an intranet, a wide area network, a local area network, or the like. In some examples, system 100 may be effective to send and receive data over network 104. The one or more processing elements 102 of system 100 may be effective to execute one or more instructions stored in memory 103 to cause the one or more processing elements 102 to execute various methods as described in further detail below. In FIG. 1, examples of a process flow 192 that may be executed by the one or more processing elements 102 are depicted within a dashed box to indicate that actions in process flow 192 may be executed by one or more components of system 100. However, as previously described, in at least some examples, one or more actions in process flow 192 may be executed by computing devices 180. In at least some examples and as described in further detail below, the various methods may comprise one or more actions such as "Generate Gradient Maps 120", "Separate Gradient Maps into Blocks 130", "Determine blockwise sum of squared differences (SSD) between frames 140", "Determine mean and standard deviation of SSD values 150", "convolve mean and standard deviation using kernel K 160", and/or "Compare convolution result to threshold for mean and standard deviation 170". Memory 103 may store the executable instructions used to execute the various methods described herein. In addition, memory 103 may store various outputs and parameters related to the various methods described herein.

Camera 101 may include, for example, a digital camera module. The digital camera module may comprise any suitable type of image sensor device or devices, such as a charge coupled device (CCD) and/or a complementary metal-oxide semiconductor (CMOS) sensor effective to capture image data from a local environment of camera 101. For example, camera 101 may include one or more lenses and may be positioned so as to capture images of a portion of the environment disposed along an optical axis (e.g., a light path) of camera 101. In the example depicted in FIG. 1, camera 101 may be positioned so as to capture video (e.g., frames of image data) representing an in-door environment (e.g., a portion of an interior of the user's home, office, etc.). Camera 101 may be a dual mode camera device effective to operate in a day mode and a night mode. During day mode operation (sometimes referred to as "RGB mode" operation), an IR cut filter may be interposed in the light path of camera 101 to block infrared light from reaching an image sensor of camera 101. While in day mode, an image signal processor (ISP) of the camera 101 may adjust various parameters of the camera 101 in order to optimize image quality for image data captured in day mode. For example, the frame rate of a video capture mode of camera 101 may be increased when switching from night mode to day mode.

During night mode operation (e.g., IR mode), the IR cut filter may be removed from the light path of camera 101. Accordingly, camera 101 may detect infrared wavelength light in the infrared portion of the spectrum as well as other portions of the electromagnetic spectrum. In some examples, camera 101 may comprise an infrared light source effective to emit infrared light to illuminate the scene 190 while in night mode. In some other examples, camera 101 may be configured in communication with an external infrared light source. In various examples, camera 101 and/or system 100 may cause an infrared light source to emit infrared light when camera 101 operates in night mode. Similarly, in various examples, when camera 101 is operated in day mode, infrared light emission by an infrared light source may be discontinued. In some examples, system 100 may be effective to determine an ambient light level of the environment and may switch between day mode and night mode operation based on the ambient light level. Various parameters may be adjusted as system 100 transitions between day mode and night mode. For example, an infrared light source of system 100 may comprise infrared light emitting diodes (LEDs). The LEDs may transition in a step-wise manner between various IR illumination levels (e.g., 25%, 50%, 75%, 100%, 0%, 21%, 76.7%, etc.). In at least some examples and as described in further detail below, transition between various different IR illumination levels may be detected as a discontinuity between frames of video data. Additionally, the automatic exposure (AE) of camera 101 may change in response to different detected ambient light levels. Change of AE may sometimes be detected as a discontinuity between frames of video data. Similarly, compression artifacts resulting from changing network conditions and/or encoder or decoder error may result in blocky artifacts in the frames of image data. Such artifacts may be detected as a discontinuity between frames of video data. The various techniques described herein may be effective to distinguish between discontinuity in the video data caused by such illumination changes and/or image data artifacts and significant motion in scene 190. Accordingly, alerts to user device 182 may be eliminated when a determination is made that the discontinuity resulted from illumination change and/or image data artifacts. Additionally, transmission of video data to user device 182 may be discontinued when a determination is made that the discontinuity resulted from illumination change and/or image data artifacts.

In some examples, prior to performing the action "Generate Gradient Maps 120" of process flow 192, processor 102 may scale down the resolution of the frames of video data, for ease and speed of pre-processing. For example, as a preprocessing step, the frames in a video may be scaled to a fixed resolution (e.g., 480×270) or to some other resolution.

At action 120 of process flow 192, system 100 and/or computing devices 180 may generate gradient maps (sometimes referred to herein as "gradient images") of one or more frames of image data of video 106. As described in further detail below, the gradient maps may be generated using an edge detection algorithm and may detect points in a frame of image data in which image brightness has discontinuities with neighboring image data.

At action 130 of process flow 192, system 100 and/or computing devices 180 may separate the each of the gradient maps generated at action 120 into blocks of pixels. For example, a gradient map of a first frame of image data may be separated in 10×10 blocks of pixels. Similarly, a gradient map of a second frame of image data, consecutive to the first frame in video 106, may be separated into 10×10 blocks of pixels. Although the values of the pixels of blocks of image data may change from frame to frame, the positions of the blocks may remain the same. Accordingly, each block in a frame of video 106 (and/or a gradient map of video 106) may be matched to a corresponding block in another frame (and/or gradient map) of video 106. For example, the topmost, leftmost block in a first frame of image data may be matched to the topmost, leftmost block in a second frame of image data. In many cases, when capturing a video of a relatively static scene with little to no motion or lighting changes, the values of the pixels comprising the matching blocks in the first and second frame (e.g., the topmost, leftmost block in each of the first and second frame) may be largely the same as these two matching blocks may correspond to the same portion of scene 190 captured at different times.

At action 140 of process flow 192, system 100 and/or computing devices 180 may determine blockwise sum of squared differences (SSD) between pairs of frames. In some examples, the frames may be consecutive frames, while in other examples, the frames may be separated by a number of intervening frames of video 106. The SSD may be calculated by determining the difference between a pixel value in a first frame and the corresponding pixel value (e.g., the pixel in the same x, y coordinate position within the frame and the particular block) in the second frame and squaring the difference. The SSD for a pair of matching blocks in two frames of image data may be the summation of all SSD values for the particular block.

At action 150 of process flow 192, system 100 and/or computing devices 180 may determine a mean SSD value and a standard deviation for the pair of frames being evaluated. The mean SSD value may be the mean value for each pair of matching blocks between the two frames (e.g., between the first frame and the second frame). The standard deviation may be the standard deviation of the SSD values of the two frames being evaluated.

At action 160 of process flow 192, system 100 and/or computing devices 180 may convolve the mean SSD value of each pair of frames being evaluated with a kernel K, as described in further detail below. Similarly, at action 160 of process flow 192, system 100 and/or computing devices 180 may convolve the standard deviation σ of the SSD values of each pair of frames being evaluated with the kernel K.

As an example of actions 120, 130, 140, 150 and 160 of process flow 192, camera 101 may capture first, second, third and fourth frames of image data. The first frame of image data may be denoted t, the second frame may be denoted t+1, the third frame may be denoted as t+2, and the fourth frame may be denoted as t+3. System 100 and/or computing devices 180 may determine a gradient map of each of t, t+1, t+2, and t+3. Each of the gradient maps may be divided into a number of blocks of pixels (e.g., 10×10 pixels). For the gradient maps of t and t+1, the SSD of each pair of matching blocks may be determined. Additionally, a mean SSD value and a standard deviation σ may be determined for the pair of frames (t, t+1). This process may be repeated for frames pairs (t+1, t+2) and (t+2, t+3). Accordingly, process flow 192 may determine a first mean and a first standard deviation for frame pair (t, t+1), a second mean and a second standard deviation for frame pair (t+1, t+2), and a third mean and a third standard deviation for frame pair (t+2, t+3). Thereafter, the three mean values may be convolved with the kernel K according to equation (1):

$$\sum_{i=1}^{3} K[i] \times f[t+i] \quad (1)$$

The three standard deviations may also be convolved using equation (1). f [t] represents either the mean or the standard deviation.

At action 170 of process flow 192, system 100 and/or computing devices 180 may compare the result of the mean convolution to a mean convolution threshold (sometimes referred to herein as a "mean threshold value"). Similarly, at action 170 of process flow 192, system 100 and/or computing devices 180 may compare the result of the standard deviation to a standard deviation convolution threshold (sometimes referred to herein as a "standard deviation threshold value"). If the result of both the mean and standard deviation convolutions are above the respective thresholds, system 100 and/or computing devices 180 may determine that a discontinuity is present in frame t+2. System 100 and/or computing devices 180 may determine that no alert should be generated as a result of the discontinuity. As previously, discussed the discontinuity may be due to lighting changes in scene 190. In various examples, the mean convolution threshold may be set at about 3e-4, although other mean convolution threshold values may be selected, depending on the desired implementation. In various examples, the standard deviation convolution threshold may be set at about 8e-4, although other standard deviation convolution threshold values may be selected, depending on the desired implementation. The mean threshold value may represent an amount of spatial change between two or more frames of image data in a video indicative of a sudden change in the image data (e.g., a sharp increase in motion over a brief time period such as within a few frames of the video) that is unlikely to be due to motion in the physical environment (e.g., a change in mean SSD due to a light turning on or off or a compression artifact present in a frame). Similarly, the standard deviation convolution threshold may be a minimum standard deviation of SSD values between two frames of image data in a video indicative of sudden changes in the image data over a brief time period that is unlikely to be due to motion in the physical environment.

Generally, determining the mean SSD determines a mean spatial difference between two frames of image data. The convolution process performed using kernel K at action 160 may be used to detect peaks in mean SSD and standard deviation of SSD over a relatively short time period (e.g., ~2-5 frames or some other number of frames captured in <1 second). In the example described above, 4 frames are used to determine whether or not a sudden change in mean SSD and standard deviation has occurred, although more or fewer frames may be used in different implementations. As described in further detail below, brief peaks in mean SSD and standard deviation are indicative of illumination changes in the scene, while real motion in the scene (e.g., a person walking through a room) typically results in more gradual and irregular changes in mean SSD and standard deviation. Accordingly, the techniques described in process flow 192 may be used to distinguish between real motion and scene discontinuity caused by illumination changes and/or compression artifacts.

Figure 2:
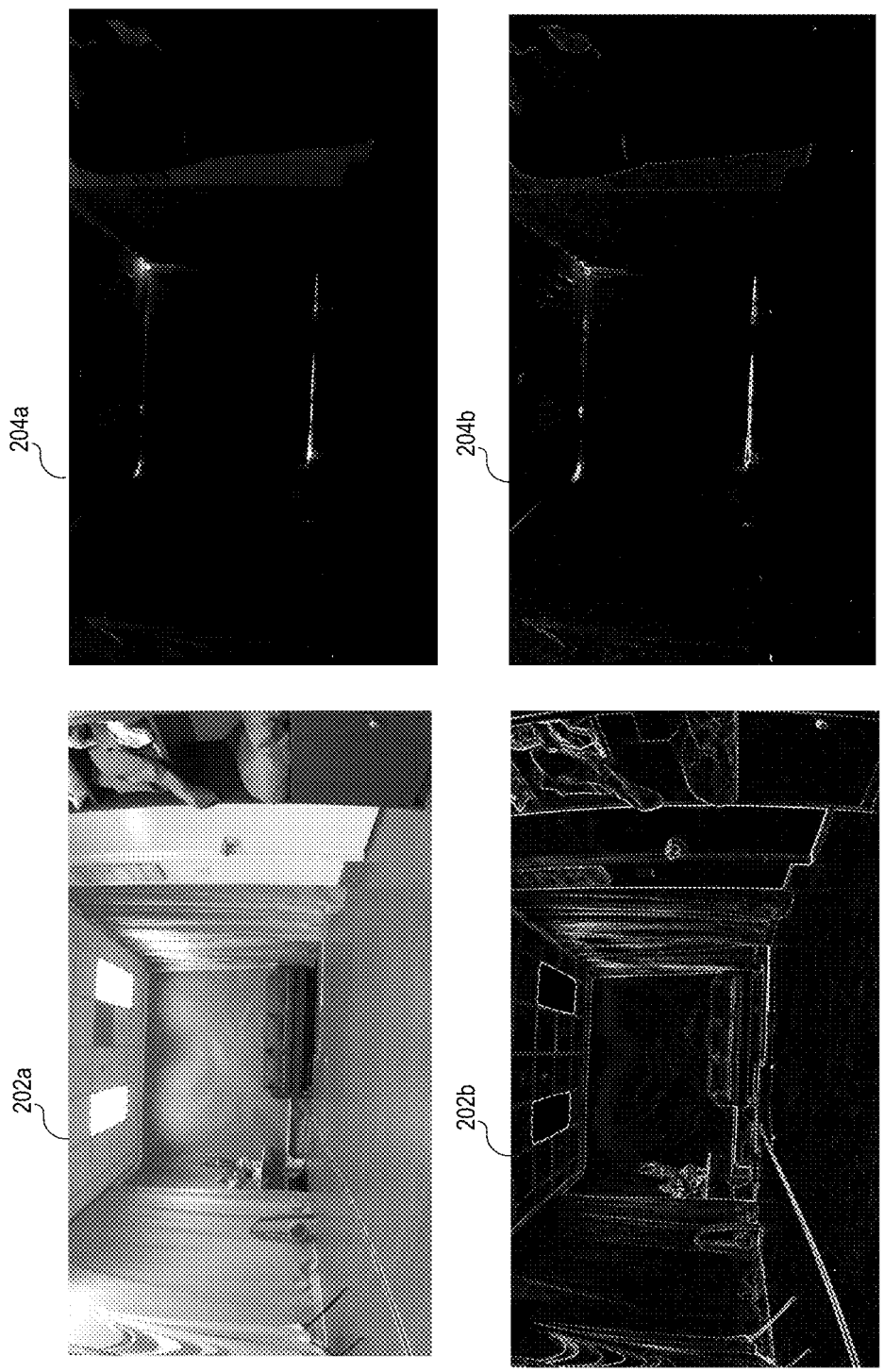
FIG. 2 depicts two sequential frames of image data captured in infrared mode and two gradient maps of the two sequential frames, in accordance with various aspects of the present disclosure.

FIG. 2 depicts two sequential frames of image data captured in infrared mode and two gradient maps of the two sequential frames, in accordance with various aspects of the present disclosure. Frame 202a and frame 204a may be two sequential frames of image data captured by camera 101 in IR mode. In some examples, frame 202a and frame 204a may be consecutive frames. However, in various other examples, video 106 may capture one or more intervening frames between frame 202a and frame 204a. Frame 202a and frame 204a depict an indoor scene. As shown in frame 202a, a light near the staircase is turned on. In frame 204a the light near the staircase has been turned off.

Gradient map 202b is a gradient map of frame 202a. Similarly, gradient map 204b is a gradient map of frame 204a. Gradient maps 202b and 204b may be generated by applying an edge detection algorithm to frames 202a and 204a, respectively. In the example depicted in FIG. 1, gradient maps 202b and 204b may be generated at action 120 of process flow 192. In an example implementation, gradients maps 202b and 204b may be generated by applying the Sobel operator to frames 202a and 204a, respectively. The Sobel operator is a discrete differentiation operator that computes an approximation of the gradient of the image intensity function of the image to which it is applied. The Sobel operator uses two 3×3 kernels $G_x$, $G_y$ which are convolved with the original image to calculate approximations of horizontal changes and vertical changes in the original image data. Convolution is the process of adding each element of the image to its local neighbors, weighted by the kernel. The first kernel $$G_x = \begin{bmatrix} +1 & 0 & -1 \\ +2 & 0 & -2 \\ +1 & 0 & -1 \end{bmatrix}$$

is an operator used to approximate horizontal changes in the original image data (e.g., frames 202a and/or 204a). $G_x$ may be applied to pixel values of a frame in the x-direction. The second kernel $$G_y = \begin{bmatrix} +1 & +2 & +1 \\ 0 & 0 & 0 \\ -1 & -2 & -1 \end{bmatrix}$$

is an operator used to approximate vertical changes in the original image data (e.g., frames 202a and/or 204a). $G_y$ may be applied to pixel values of a frame in the y-direction. The resulting gradient approximations may be combined to determine the gradient magnitude $$G = \sqrt{G_x^2 + G_y^2}.$$

Although, the Sobel operator is described herein and may offer some advantages in terms of speed, memory requirements and/or the amount of computing resources needed, other edge detection algorithms may instead be used in accordance with the discontinuity detection techniques described herein. For example, the Canny edge detector, differential edge detector, Scharr operator, Prewitt operator, or some other edge detection technique, may be used in accordance with the techniques described herein.

Figure 3:
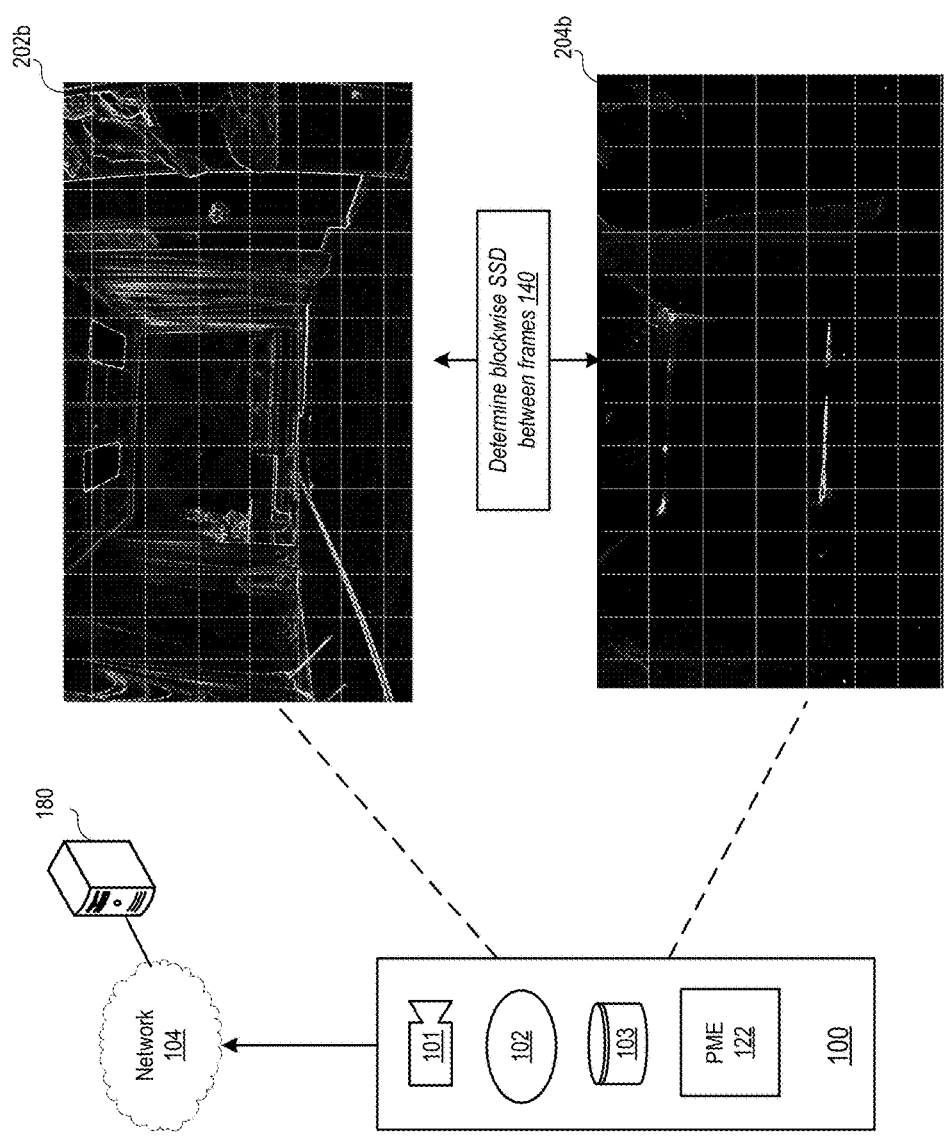
FIG. 3 illustrates separation of the gradient maps of FIG. 2 into blocks of image data, in accordance with various aspects of the present disclosure.

FIG. 3 illustrates separation of the gradient maps of FIG. 2 into blocks of image data, in accordance with various aspects of the present disclosure. As depicted in FIG. 3, gradient maps 202b and 204b may be separated into a number of blocks of pixels (represented by white horizontal and vertical grid lines in FIG. 3). In the example depicted in FIG. 1, gradient maps 202b and 204b may be separated into blocks at action 130 of process flow 192. Each block may comprise a location within the frame (e.g., in terms of the blocks x, y coordinate position within the frame). Accordingly, a block in gradient map 202b may be matched to a corresponding block in gradient map 204b. "Corresponding", "matched", and/or "matching" blocks may refer to blocks of pixels which are at the same x, y coordinate position in their respective frames. For example, the top leftmost block of pixels in gradient map 202b matches the top leftmost block of pixels in gradient map 204b, etc.

At action 140 of process flow 192 of FIG. 1, the SSD may be determined for each pair of matching blocks in gradient maps 202b and 204b. SSD may be determined by squaring the total difference between the pixel values of two matching blocks. SSD represents the spatial difference between the two matching blocks. At action 150 of process flow 192 of FIG. 1, the mean SSD among all matching blocks of gradient maps 202b, 204b may be determined. Similarly, the standard deviation among all SSD values of matching blocks of gradient maps 202b, 204b may be determined. Accordingly, for each pair of frames (e.g., frames 202a, 204a), a mean SSD value and a standard deviation $\sigma$ may be determined. As previously described, multiple pairs of frames may be evaluated in accordance with the discontinuity detection techniques described herein. In the following examples, four frames (and four corresponding gradient maps) t, t+1, t+2, and t+3 are described for illustrative purposes. However, another number of frames may be evaluated instead in accordance with the discontinuity detection techniques described herein. When evaluating frames t, t+1, t+2, and t+3, three mean SSD values and three mean standard deviations may be determined (e.g., one mean SSD and one for each of the three frame pairs (t, t+1), (t+1, t+2) and (t+2, t+3)).

Figure 4:
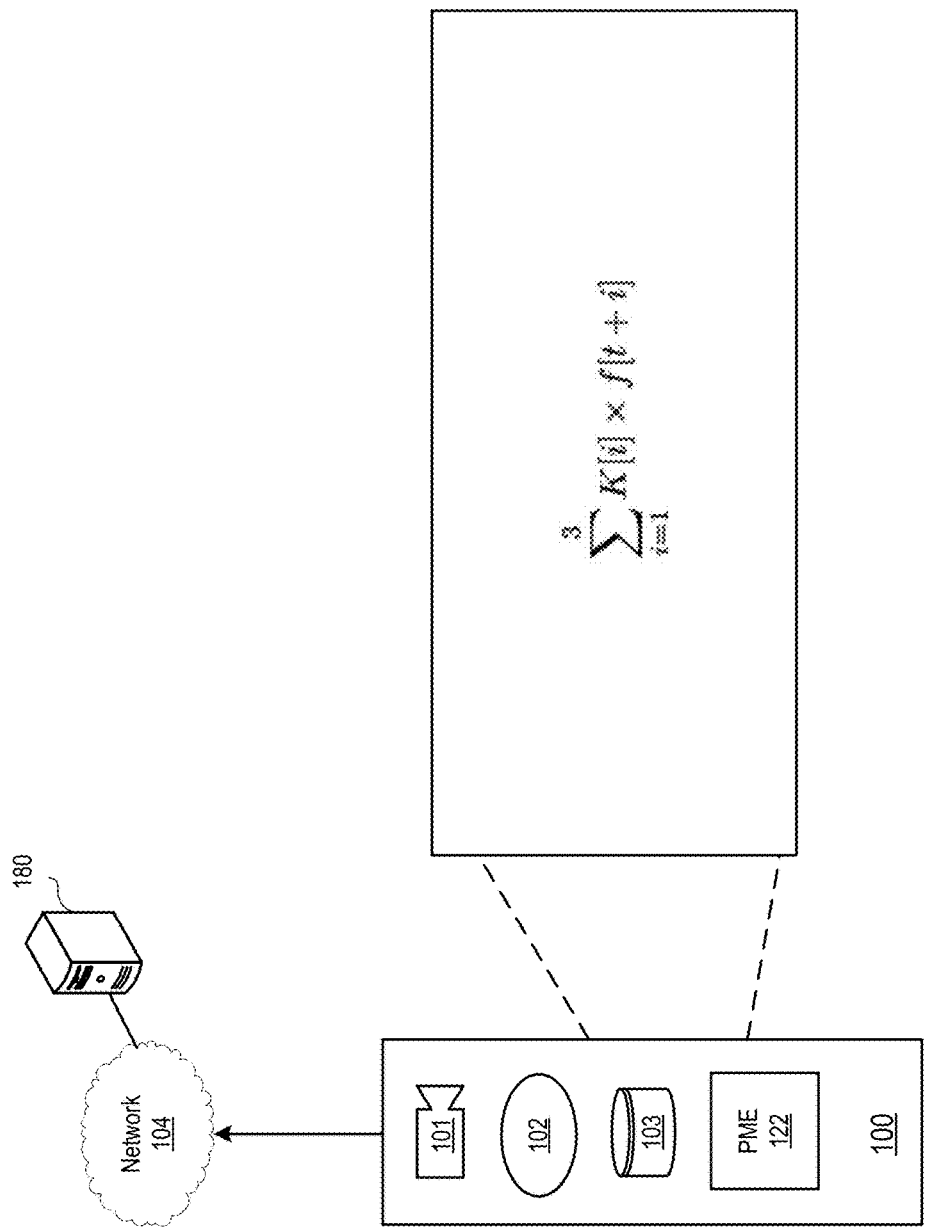
FIG. 4 is an illustration of a convolution technique using an inverted Laplacian of Gaussian style convolution kernel K, in accordance with various aspects of the present disclosure.

FIG. 4 is an illustration of a convolution technique using an inverted Laplacian of Gaussian style convolution kernel K, in accordance with various aspects of the present disclosure. At action 160 of process flow 192 depicted in FIG. 1, the mean SSD for each pair of frames/gradient maps being evaluated may be convolved with a convolution kernel K. Kernel K is an inverted Laplacian of Gaussian (LoG) style 1×3 discrete kernel K=[$(\alpha-1)/2, \alpha, (\alpha-1)/2$], where 0<$\alpha$<1. In various examples, $\alpha$ may be a peak significance factor used to weight peaks in the convolution result, as well as valleys (e.g., local minima) disposed adjacent to the peaks in the convolution result. Similarly, the standard deviation for each pair of frames/gradient maps being evaluated may be convolved with the convolution kernel K. In the example depicted in FIG. 4, three frame pairs (t, t+1), (t+1, t+2) and (t+2, t+3) are evaluated. Therefore, three mean SSD values are convolved with the kernel K and three standard deviation values are convolved with the kernel K according to equation (1), above. As previously described, other numbers of frame pairs may be evaluated in accordance with the techniques described herein. Accordingly, equation (2) is a general form for equation (1) above.

$$\sum_{i=1}^{N} K[i] \times f[t+i] \qquad (2)$$

f[t] represents either the mean or standard deviation for a particular pair of frames i. An example result of the convolution is depicted in FIG. 5.

Figure 5:
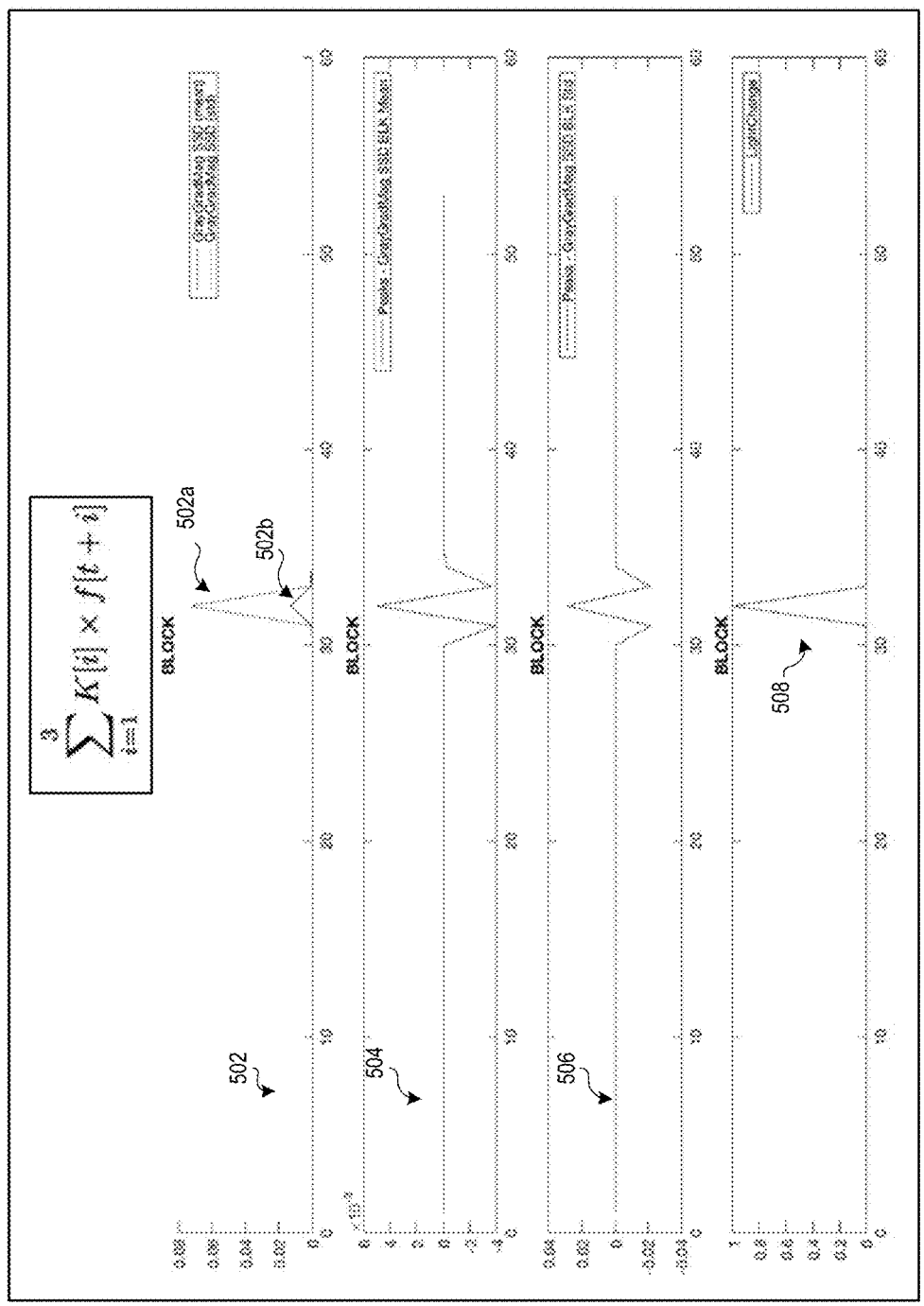
FIG. 5 depicts a result of the convolution shown in FIG. 4, in accordance with various aspects of the present disclosure.

FIG. 5 depicts a result of the convolution described in FIG. 4, in accordance with various aspects of the present disclosure. In the example depicted in FIG. 5, the value of a of convolution kernel K was set to 0.4. The shape of the kernel K and the value of a may be selected so as to output a large response when the input signal (e.g., the mean SSD or standard deviation of a pair of frames) has a sharp local peak.

The top row plot (e.g., signal 502) represents the mean SSD and standard deviation of pairs of frames/gradient maps over time. Peak 502a represents a local peak in standard deviation and peak 502b represents a local peak in SSD mean. Peaks 502a and 502b result from the change in illumination conditions between frames 202a and 204a of FIG. 2.

The second row (from top) plot represents the convolution response 504 after convolving the mean SSD with the kernel K using equation (2), above. Similarly, the third row (from top) plot represents the convolution response 506 after convolving the standard deviation with the kernel K using equation (2), above. The convolution response 504 is compared to a mean convolution threshold and the convolution response 506 is compared to a standard deviation convolution threshold. If the convolution response 504 exceeds the mean convolution threshold and the convolution response 506 exceeds the standard deviation convolution threshold, a Boolean 0/1 flag is updated from a value of 0 to a value of 1 (or, in other examples, from 1 to 0), as depicted in plot 508. The Boolean flag being triggered indicates that the discontinuity detected should not trigger an alert to a user. Accordingly, in the example depicted in FIG. 5, no alert may be sent to a user via a user device (e.g., user device 182 associated with user 184 in FIG. 1).

Figure 6:
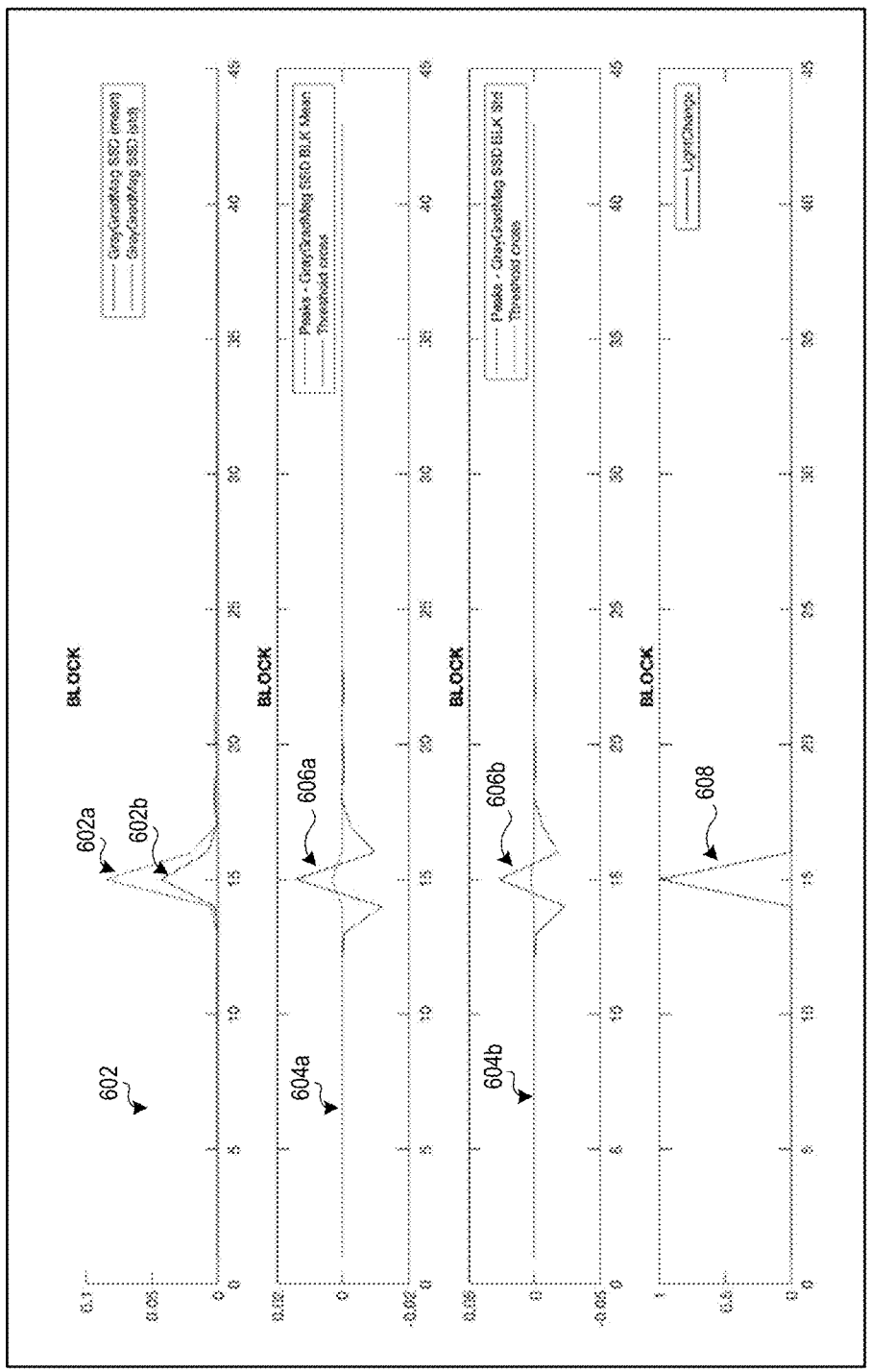
FIG. 6 depicts an example convolution result used to detect discontinuity in video data, in accordance with various aspects of the present disclosure.

FIG. 6 depicts an example convolution result used to detect discontinuity in video data, in accordance with various aspects of the present disclosure. The top row plot (e.g., signal 602) represents the mean SSD and standard deviation of pairs of frames/gradient maps over time. Peak 602*a* represents a local peak in standard deviation and peak 602*b* represents a local peak in SSD mean. Peaks 602*a* and 602*b* result from a change in illumination in an otherwise static environment. In the example, the environment may be an indoor scene where a light has been turned on, but otherwise shows little to no motion within the scene.

The second row (from top) plot represents the convolution response 606*a* after convolving the mean SSD with the kernel K using equation (2), above. As depicted, the convolution response 606*a* exceeds the mean convolution threshold 604*a* during a local peak. Similarly, the third row (from top) plot represents the convolution response 606*b* after convolving the standard deviation with the kernel K using equation (2), above. As depicted, the convolution response 606*b* exceeds the standard deviation convolution threshold 604*b* during a local peak in convolution response 606*b*.

Since the convolution response 606*a* exceeds the mean convolution threshold 604*a* and the convolution response 606*b* exceeds the standard deviation convolution threshold 604*b*, a Boolean 0/1 flag is updated from a value of 0 to a value of 1 (or, in other examples, from 1 to 0), as depicted in plot 608. The Boolean flag being triggered indicates that the discontinuity detected should not trigger an alert to a user. Accordingly, in the example depicted in FIG. 6, no alert may be sent to a user via a user device (e.g., user device 182 associated with user 184 in FIG. 1).

Figure 7:
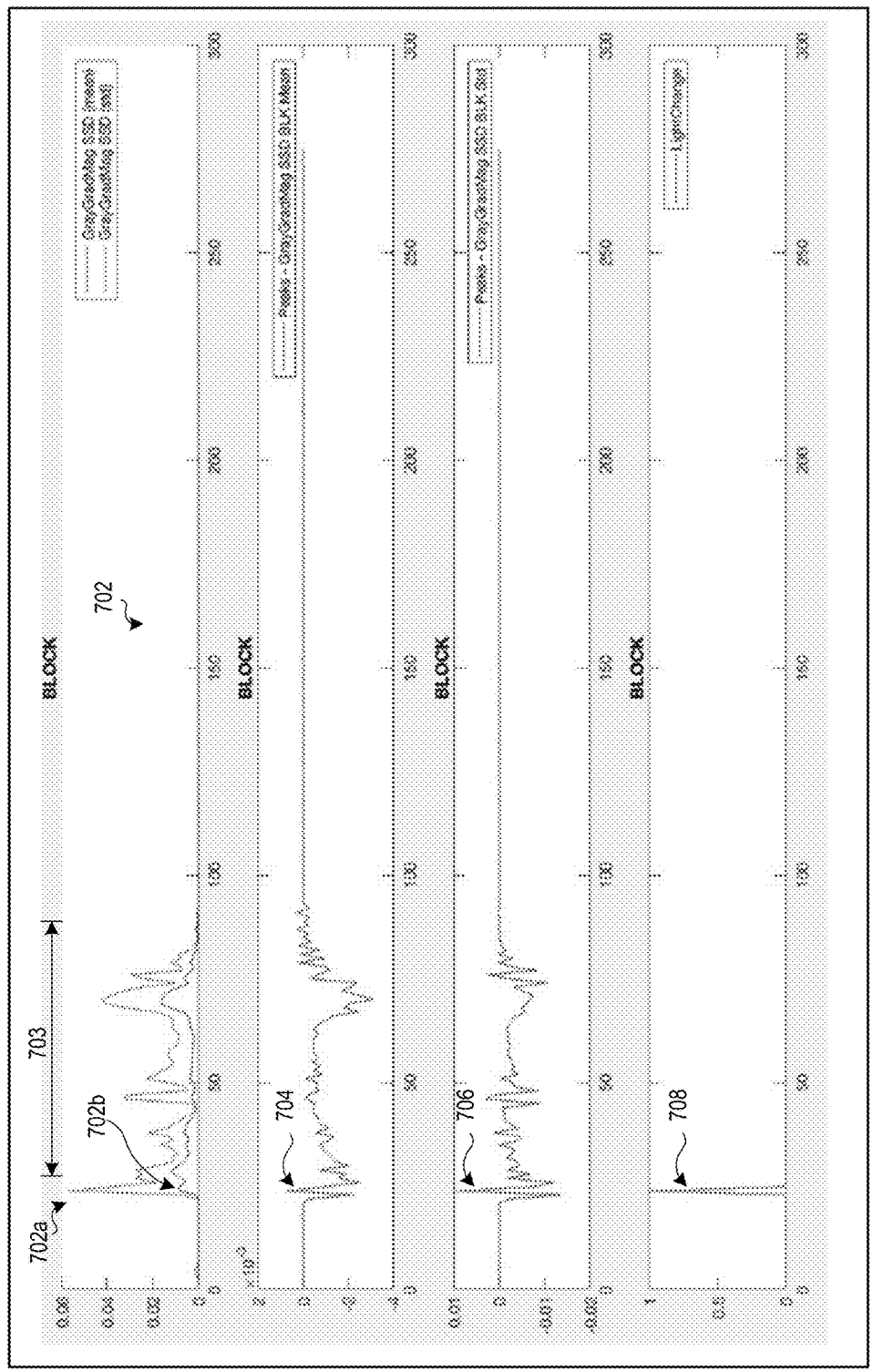
FIG. 7 depicts an example of various infrared illumination states that may be used to control streaming of video in accordance with various aspects of the present disclosure.

FIG. 7 depicts an example convolution result used to detect discontinuity in video data, in accordance with various aspects of the present disclosure. In the example depicted in FIG. 7, the camera 101 is positioned in an apartment such that a door is visible in the video captured by the camera 101. The initial peak in the mean SSD at 702*b* and the standard deviation at 702*a* of plot 702 result from the door being rapidly opened. Thereafter, a person walks through the door and exits the field-of-view of the camera. Accordingly, region 703 of plot 702 depicts a region of the video in which motion is occurring. During the motion of the person walking through the video frames, the mean SSD and standard deviation are varying over time. However, the local peaks of region 703 do not show the same type of sharp peaks as the initial peak at 702*a*.

The second row (from top) plot represents the convolution response 704 after convolving the mean SSD with the kernel K using equation (2), above. Similarly, the third row (from top) plot represents the convolution response 706 after convolving the standard deviation with the kernel K using equation (2), above. The convolution response 704 is compared to a mean convolution threshold and the convolution response 706 is compared to a standard deviation convolution threshold. The initial peak of convolution response 704 exceeds the mean convolution threshold and the initial peak of convolution response 706 exceeds the standard deviation convolution threshold. Accordingly, a Boolean 0/1 flag is updated from a value of 0 to a value of 1 (or, in other examples, from 1 to 0), as depicted in plot 708. The Boolean flag being triggered indicates that the discontinuity detected should not trigger an alert to a user. Accordingly, the sharp peak generated by the person opening the door is detected as a discontinuity. However, the subsequent movement of the person through the frames of the video in region 703 do not trigger the Boolean 0/1 flag. This is because the convolution response 704 and the convolution response 706 do not exceed their respective thresholds in region 703. Accordingly, in the example depicted in FIG. 7, while no alert may be sent to a user via a user device due to the initial peak at 702*a*, 702*b*, subsequent motion of the person in region 703 of the video may trigger an alert. As such, the discontinuity detection techniques described herein may be capable of distinguishing between real motion and illumination changes and/or compression artifacts.

Figure 8:
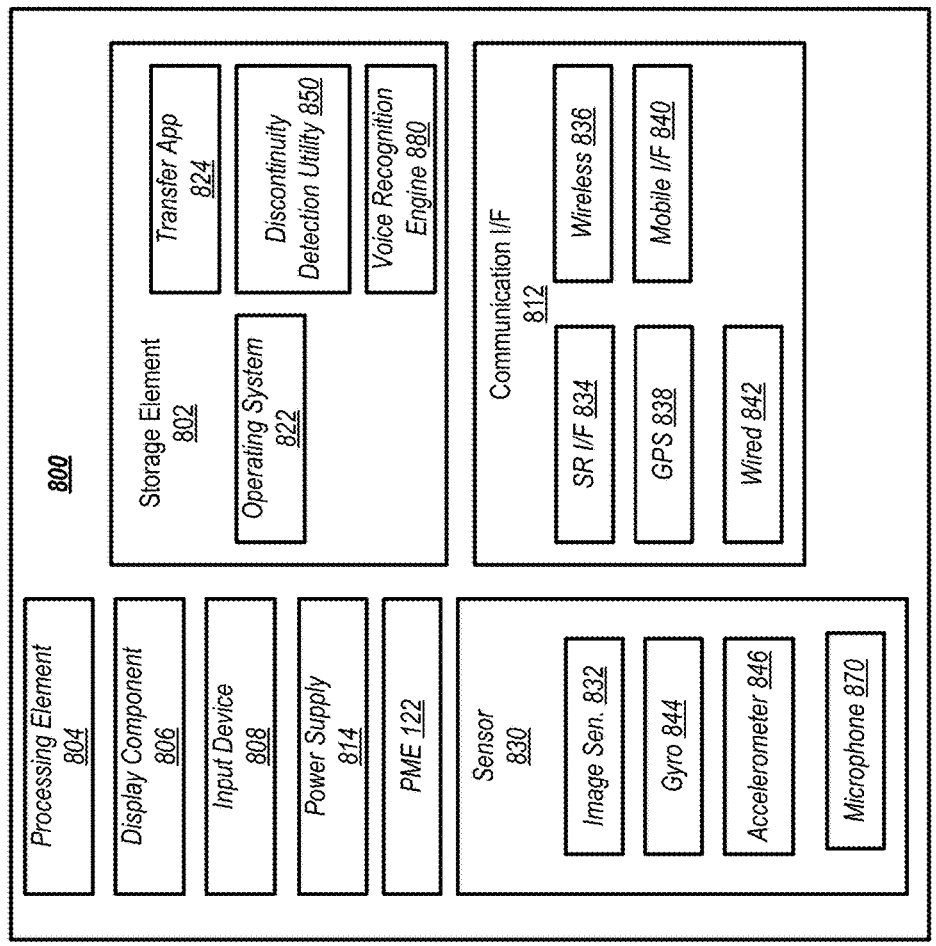
FIG. 8 is a block diagram showing an example architecture of a computing device in which the system described in the present disclosure, or a portion thereof, may be implemented, in accordance with various embodiments described herein.

FIG. 8 is a block diagram showing an example architecture 800 of a user device, such as the image capture devices, processors, mobile devices, and other computing devices described herein. It will be appreciated that not all user devices will include all of the components of the architecture 800 and some user devices may include additional components not shown in the architecture 800. The architecture 800 may include one or more processing elements 804 for executing instructions and retrieving data stored in a storage element 802. The processing element 804 may comprise at least one processor. Any suitable processor or processors may be used. For example, the processing element 804 may comprise one or more digital signal processors (DSPs) and/or image signal processors (ISPs). In some examples, the processing element 804 may be effective to filter image data into different frequency bands, as described above. The storage element 802 can include one or more different types of non-transitory, computer-readable memory, data storage, or computer-readable storage media devoted to different purposes within the architecture 800. For example, the storage element 802 may comprise flash memory, random-access memory, disk-based storage, etc. Different portions of the storage element 802, for example, may be used for program instructions for execution by the processing element 804, storage of images or other digital works, and/or a removable storage for transferring data to other devices, etc.

The storage element 802 may also store software for execution by the processing element 804. An operating system 822 may provide the user with an interface for operating the user device and may facilitate communications and commands between applications executing on the architecture 800 and various hardware thereof. A transfer application 824 may be configured to receive images and/or video from another device (e.g., a mobile device, image capture device, and/or display device) or from an image sensor 832 included in the architecture 800 (e.g., camera 101). In some examples, the transfer application 824 may also be configured to upload the received images to another device that may perform processing as described herein (e.g., a mobile device and/or another computing device).

In some examples, storage element 802 may include a discontinuity detection utility 850. The discontinuity detection utility 850 may be configured to generate gradient maps using an edge detection algorithm. The discontinuity detection utility 850 may be further effective to determine the blockwise SSD of sequential frames of video data, in accordance with the various techniques described herein. Additionally, in at least some examples, the discontinuity detection utility 850 may be effective to perform the convolution with the kernel K in order to determine whether or not a user alert should be generated due to any detected discontinuity among frames of video data. In various other examples, the discontinuity detection utility 850 may be effective to perform various other actions of process flow 192 depicted in FIG. 1.

When implemented in some user devices, the architecture 800 may also comprise a display component 806. The display component 806 may comprise one or more light-emitting diodes (LEDs) or other suitable display lamps. Also, in some examples, the display component 806 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 800 may also include one or more input devices 808 operable to receive inputs from a user. The input devices 808 can include, for example, a push button, touch pad, touch screen, wheel, joystick, keyboard, mouse, trackball, keypad, light gun, game controller, or any other such device or element whereby a user can provide inputs to the architecture 800. These input devices 808 may be incorporated into the architecture 800 or operably coupled to the architecture 800 via wired or wireless interface. In some examples, architecture 800 may include a microphone 870 for capturing sounds, such as voice commands. Voice recognition engine 880 may interpret audio signals of sound captured by microphone 870. In some examples, voice recognition engine 880 may listen for a "wake word" to be received by microphone 870. Upon receipt of the wake word, voice recognition engine 880 may stream audio to a voice recognition server for analysis. In various examples, voice recognition engine 880 may stream audio to external computing devices via communication interface 812.

When the display component 806 includes a touch-sensitive display, the input devices 808 can include a touch sensor that operates in conjunction with the display component 806 to permit users to interact with the image displayed by the display component 806 using touch inputs (e.g., with a finger or stylus). The architecture 800 may also include a power supply 814, such as a wired alternating current (AC) converter, a rechargeable battery operable to be recharged through conventional plug-in approaches, or through other approaches such as capacitive or inductive charging.

The communication interface 812 may comprise one or more wired or wireless components operable to communicate with one or more other user devices. For example, the communication interface 812 may comprise a wireless communication module 836 configured to communicate on a network, such as the network 104, according to any suitable wireless protocol, such as IEEE 802.11 or another suitable wireless local area network (WLAN) protocol. A short range interface 834 may be configured to communicate using one or more short range wireless protocols such as, for example, near field communications (NFC), Bluetooth, Bluetooth LE, etc. A mobile interface 840 may be configured to communicate utilizing a cellular or other mobile protocol. A Global Positioning System (GPS) interface 838 may be in communication with one or more earth-orbiting satellites or other suitable position-determining systems to identify a position of the architecture 800. A wired communication module 842 may be configured to communicate according to the USB protocol or any other suitable protocol. In various examples where architecture 800 represents camera 101 (shown in FIG. 1), mobile interface 840 may allow camera 101 to communicate with one or more other computing devices such as computing devices 180 shown in FIG. 1. For example, camera 101 may receive a command from a user device, an application of a user device, or a voice recognition server to capture an image or video. Camera 101 may receive a command from the user device to send the captured image or video to the mobile device or to another computing device.

The architecture 800 may also include one or more sensors 830 such as, for example, one or more position sensors, image sensors, and/or motion sensors. An image sensor 832 is shown in FIG. 8. Some examples of the architecture 800 may include multiple image sensors 832. For example, a panoramic camera system may comprise multiple image sensors 832 resulting in multiple images and/or video frames that may be stitched and may be blended to form a seamless panoramic output. An example of an image sensor 832 may be camera 101 shown and described in FIG. 1. As described, camera 101 may be configured to capture color information, IR image data, image geometry information, and/or ambient light information.

Motion sensors may include any sensors that sense motion of the architecture including, for example, gyro sensors 844 and accelerometers 846. Motion sensors, in some examples, may be used to determine an orientation, such as a pitch angle and/or a roll angle, of camera 101 (shown in FIG. 1). The gyro sensor 844 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 846 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 838 may be utilized as a motion sensor. For example, changes in the position of the architecture 800, as determined by the GPS interface 838, may indicate the motion of the GPS interface 838. As described, in some examples, image sensor 832 may be effective to detect infrared light. In at least some examples, architecture 800 may include an infrared light source to illuminate the surrounding environment.

Figure 9:
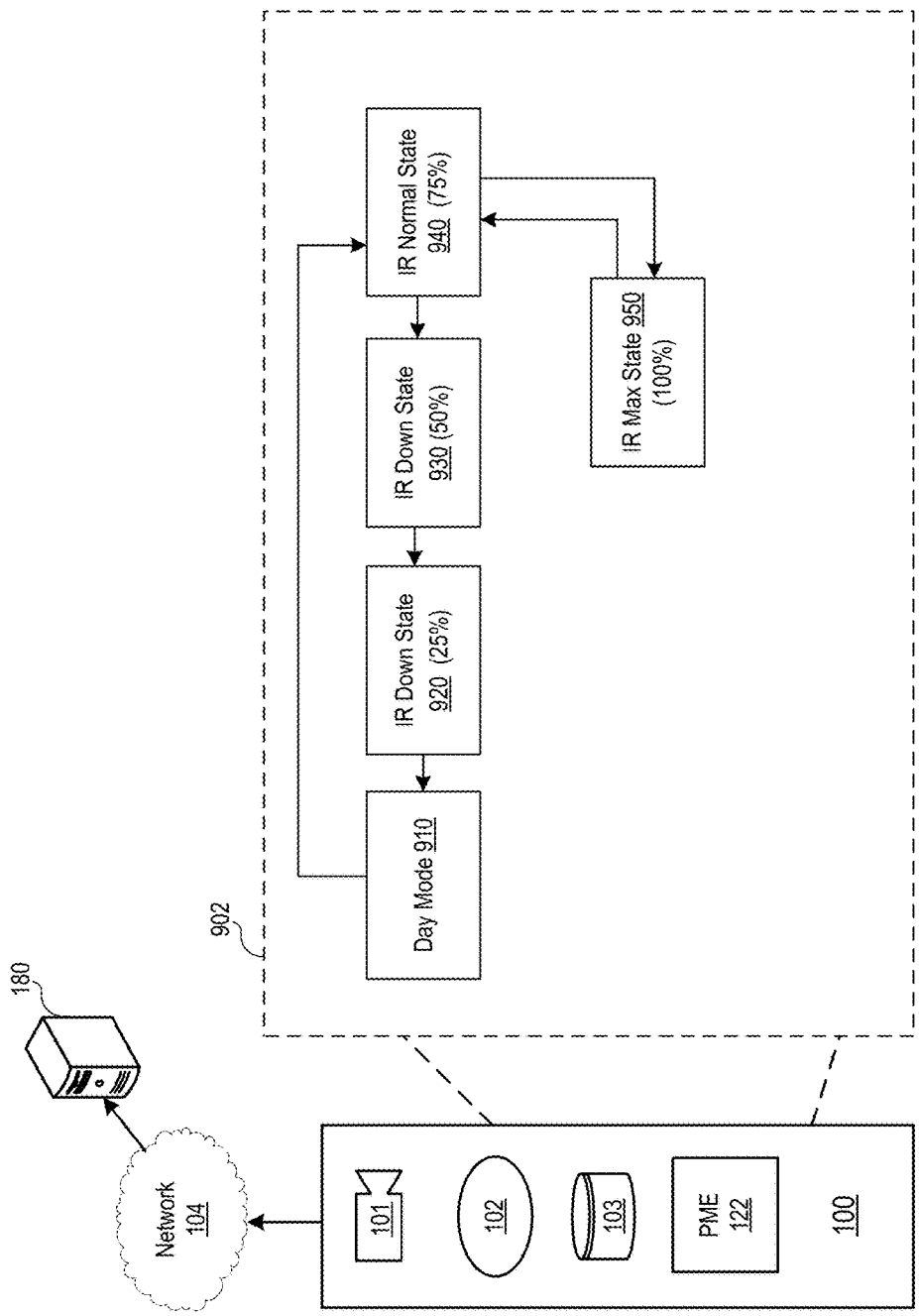
FIG. 9 depicts an example of various infrared illumination states that may be detected as a discontinuity in video data, in accordance with various aspects of the present disclosure.

FIG. 9 depicts an example of various infrared illumination states that may be detected as a discontinuity in video data, in accordance with various aspects of the present disclosure. Generally, significantly changing the amount of IR illumination on the scene 190 may cause process flow 192 to detect a discontinuity and prevent the generation of a user alert due to the IR illumination change. Process 902 depicted in FIG. 9 may be used to switch between day mode 910 and various IR illumination states. The various IR illumination states depicted in FIG. 9 and the logic for switching between various IR illumination states is provided for exemplary purposes only. It should be appreciated that various other IR illumination states and IR illumination state switching logic-flows apart from what is depicted in FIG. 9 may instead be used in accordance with various aspects of the present disclosure.

Day mode 910 may indicate that camera 101 is operating in day mode (e.g., with no IR illumination and/or with an IR illumination cut filter positioned along the optical path of the image sensor of camera 101). Camera 101 may transition from day mode 910 to IR normal state 940 (e.g., night mode). For example, camera 101 may transition from day mode to night mode based on an ambient light sensor detecting low visible light levels in scene 190. In IR normal state 940, IR light may be projected onto scene 190. In the example depicted in FIG. 9, an IR illumination source may be operating at 75% capacity when system 100 is operating in IR normal state 940, although 75% capacity is merely an example and other capacities may be used in accordance with the various techniques described herein. Switching from Day mode 910 to IR normal state 940 may cause process flow 192 to detect a discontinuity due to the sudden change in the amount of IR illumination in the video 106. However, using the techniques of process flow 192, system 100 and/or computing devices 180 may determine that the discontinuity is not real motion in the scene and should therefore not trigger an alert.

Similarly, night mode of system 100 may comprise a number of different states with different IR illumination capacities. In the example depicted in FIG. 9, night mode comprises IR down state 920, IR down state 930, and IR max state 950 in addition to IR normal state 940. Transitioning between any two states may cause an illumination change as the amount of IR illumination projected onto the scene may be altered by transitioning between the various states. The various techniques of discontinuity detection described herein may be effective to distinguish between real motion in the scene and illumination changes, such as those caused by transitioning between the various states 910, 920, 930, 940 and/or 950.

Additionally, the exposure time of camera 101 may be changed at various times. For example, the exposure time of camera 101 may be automatically adjusted when transitioning from night mode to day mode and when transitioning from day mode to night mode to account for changing external light conditions. The various techniques of discontinuity detection described herein may be effective to distinguish between real motion in the scene and illumination changes, such as those caused by automatic exposure changes. Finally, changing network conditions (particularly in wireless networks) may cause decoder artifacts and/or other compression artifacts to appear in decoded frames of image data. Because such changes occur very rapidly within the video stream, the discontinuity detection techniques described herein may be effective to distinguish between discontinuity caused by such compression artifacts and discontinuity caused by actual motion in the scene. As discussed, alerts may be suppressed when a determination is made that the discontinuity is not due to real motion.

Figure 10:
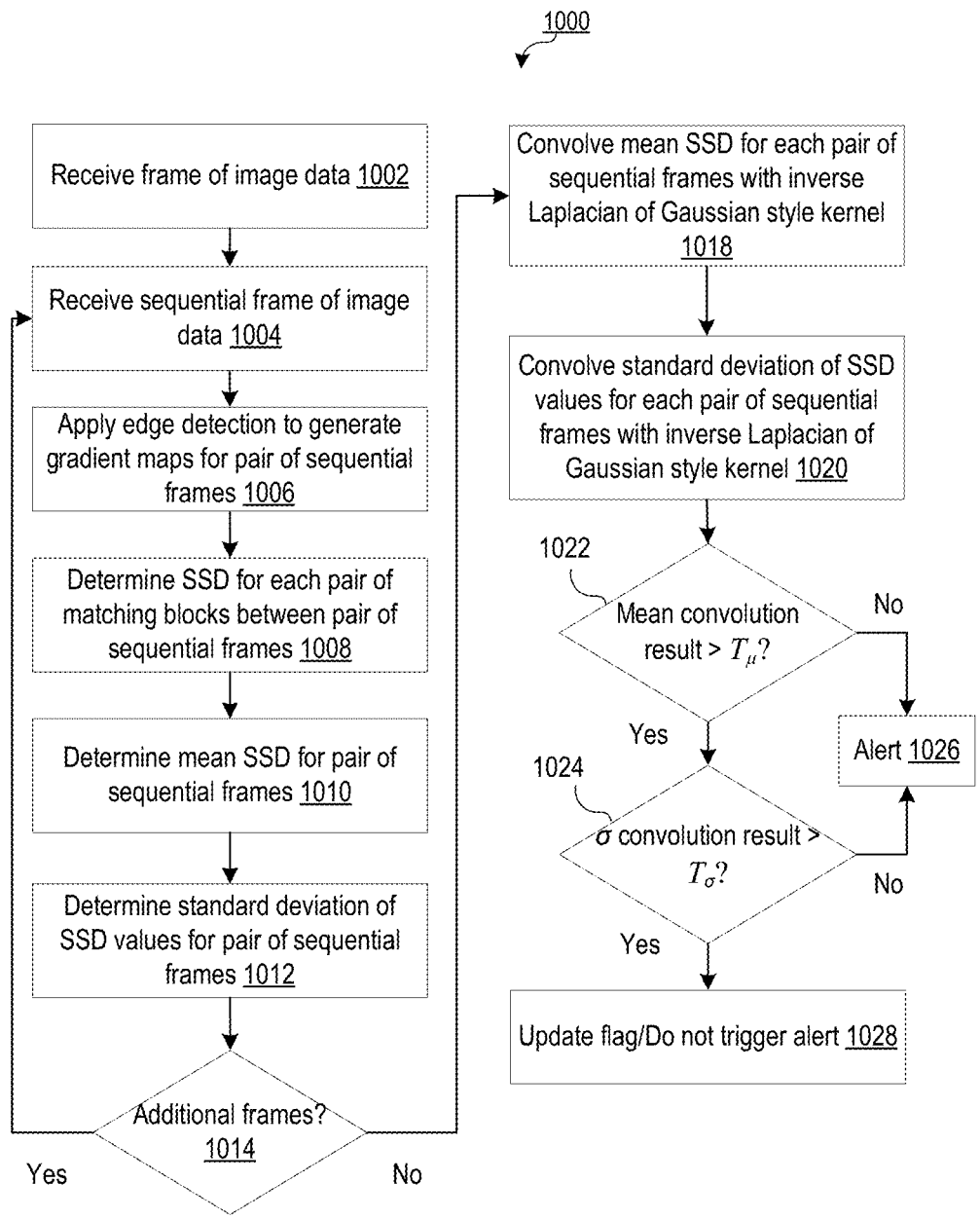
FIG. 10 depicts a flow chart showing an example process for detecting discontinuity in video data, in accordance with various aspects of the present disclosure.

FIG. 10 depicts a flow chart showing an example process for detecting discontinuity in video data, in accordance with various aspects of the present disclosure. The process flow 1000 of FIG. 10 may be executed by at least one processor 102 and/or by a combination of at least one processor 102, PME 122, and/or camera 101. In some further examples, the process flow 1000 may be executed at least in part by one or more remote computing devices such as remote computing device 180 depicted in FIG. 1. The actions of process flow 1000 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process flow 1000 may be described with reference to elements of FIGS. 1-9.

Processing may begin at action 1002, "Receive frame of image data". At action 1002, a frame of image data captured by camera 101 may be received. The frame of image data may be a frame of video 106 depicted in FIG. 1.

Processing may continue from action 1002 to action 1004, "Receive sequential frame of image data". At action 1004, a sequential frame of image data may be received. In various examples, the sequential frame may be a frame following the frame received at action 1002 in video 106. In some examples, the sequential frame may be consecutive to the frame received at action 1002, while in other examples, one or more intervening frames of video 106 may be between the frame received at action 1002 and the sequential frame received at action 1004.

Processing may proceed from action 1004 to action 1006, "Apply edge detection to generate gradient maps for pair of sequential frames 1006". At action 1006 an edge detection algorithm may be employed to generate gradient maps for the pair of sequential frames being evaluated (e.g., the frames received at actions 1002 and 1004). In one example, the Sobel operator may be used to generate the gradient maps.

Processing may proceed from action 1006 to action 1008, "Determine SSD for each pair of matching blocks between pair of sequential frames". At action 1008, the SSD may be determined for each pair of matching blocks for the pair of sequential frames. The SSD may represent a measure of spatial differences in pixel data between each pair of blocks.

Processing may proceed from action 1008 to action 1010, "Determine mean SSD for pair of sequential frames". At action 1010, a mean SSD for the pair of sequential frames may be determined. The mean SSD may represent the mean SSD value among the SSD value of all blocks for the frame pair.

Processing may proceed from action 1010 to action 1012, "Determine standard deviation of SSD values for pair of sequential frames". At action 1012, the standard deviation of SSD values of all blocks for the frame pair may be determined. For example, the standard deviation may be determined using the mean SSD value determined at action 1010.

At action 1014, a determination may be made whether or not there are additional frames to evaluate prior to proceeding with other actions of process flow 1000. In various examples, if a determination is made at action 1014 that other frames are to be evaluated, processing may return to action 1004. Otherwise, processing may proceed to action 1018, "Convolve mean SSD for each pair of sequential frames with inverse Laplacian of Gaussian style kernel." At action 1018, the mean SSD determined at action 1010 may be convolved with an inverse Laplacian of Gaussian style kernel (e.g., the 1×3 kernel K described above). Any number of frames may be convolved. For example, N frames may be convolved according to $$\sum_{i=1}^{N} K[i] \times f[t+i].$$

In various examples, in order to determine whether or not a lighting change occurred within a particular frame, at least the next, subsequent frame may be evaluated. For example, to determine whether or not a lighting change or compression artifact has occurred in a frame t, a frame t+1 may be used in the convolution.

Processing may proceed from action 1018 to action 1020, "Convolve standard deviation of SSD values for each pair of sequential frames with inverse Laplacian of Gaussian style kernel." At action 1020, the standard deviation of SSD values determined at action 1012 may be convolved with an inverse Laplacian of Gaussian style kernel (e.g., the 1×3 kernel K described above). Any number of frames may be convolved. For example, N frames may be convolved according to $$\sum_{i=1}^{N} K[i] \times f[t+i].$$

In various examples, in order to determine whether or not a lighting change occurred within a particular frame, at least the next, subsequent frame may be evaluated. For example, to determine whether or not a lighting change or compression artifact has occurred in a frame t, a frame t+1 may be used in the convolution.

Processing may proceed from action 1020 to action 1022 at which a determination is made whether or not a result of the convolution described at action 1018 exceeds a mean convolution threshold value $T_\mu$. If so, processing proceeds from action 1022 to action 1024. If not, processing proceeds from action 1022 to action 1026 at which a user alert is generated. The alert may be sent to a user computing device such as user device 184 depicted in FIG. 1. The alert may serve to alert a user that motion has been captured by camera 101. For example, system 100 (FIG. 1) may be an indoor monitoring device. The alert generated at action 1026 may alert the user that motion has been detected in video 106 captured by camera 101 of system 100 while the user is away. Accordingly, the user may review video 106 to determine whether or not an intruder is present in the monitored area. In various examples, process flow 1000 may be a pre-processing stage for a motion detection and/or human detection algorithm. Accordingly, in some examples, in conjunction with alert 1026 being generated, video 106 and/or portions thereof may be sent to a motion detection and/or human detection algorithm for further processing. In some examples, the motion detection and/or human detection algorithms may be executed by computing devices 180 (e.g., by a cloud computing service).

If a determination is made at action 1022 that the mean convolution result exceeds the mean convolution threshold value $T_\mu$, processing may proced to action 1024 at which a determination is made whether or not a result of the convolution described at action 1020 exceeds a standard deviation convolution threshold value $T_\sigma$. If not, processing may proceed to action 1026 at which an alert is generated (as described above in reference to action 1022). If so, processing may proceed to action 1028 at which a Boolean flag or other indicator data is updated so as not to trigger an alert. In various examples, if processing proceeds to action 1028, a determination may be made that the discontinuity detected is the result of an illumination change and/or compression artifact.

Among other potential benefits, a system in accordance with the present disclosure may limit and/or reduce the number of alerts generated due to lighting changes, exposure changes, compression artifacts and/or other non-motion events. Accordingly, the various techniques described herein may be used to discriminate between motion that is of significant interest to users and motion triggers caused by illumination changes.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of motion detection, comprising:
  receiving, from a camera, a first frame of video data representing a physical environment;

receiving, from the camera, a second frame of the video data, wherein the second frame is consecutive to the first frame;

dividing the first frame into a first plurality of blocks of pixels, the first plurality of blocks of pixels including a first block of pixels and a second block of pixels;

dividing the second frame into a second plurality of blocks of pixels, the second plurality of blocks of pixels including a third block of pixels and a fourth block of pixels;

determining a set of matching block pairs by matching each block of pixels of the first plurality of blocks of pixels with a corresponding block of pixels of the second plurality of blocks of pixels, wherein each matching block pair of the set of matching block pairs represents a same region of the physical environment;

for each matching block pair of the set of matching block pairs, determining a sum of squared differences (SSD) of the matching block pair to generate SSD values of the set of matching block pairs;

determining a first mean SSD value for the set of matching block pairs;

determining a standard deviation of the SSD values of the set of matching block pairs;

determining a first convolution of the first mean SSD value with a kernel K, wherein K=[($\alpha$−1)/2, $\alpha$, ($\alpha$−1)/2], where 0<$\alpha$<1, wherein $\alpha$ is a peak significance factor used to weight the first convolution;

determining a second convolution of the standard deviation of the SSD values with the kernel K;

determining that a first result of the first convolution is greater than a mean threshold value, wherein the mean threshold value indicates an amount of change between two or more frames of image data that is not due to motion in the physical environment;

determining that a second result of the second convolution is greater than a standard deviation convolution threshold value, wherein the standard deviation convolution threshold value indicates an amount of deviation between changes in the two or more frames of image data that is not due to motion in the physical environment; and determining that differences in the video data between the first frame and the second frame are due to an illumination change in the physical environment and not due to motion in the physical environment.

2. The method of claim 1, further comprising:
applying a first operator $$G_x = \begin{bmatrix} +1 & 0 & -1 \\ +2 & 0 & -2 \\ +1 & 0 & -1 \end{bmatrix}$$

to pixel values of the first frame in an x-direction;
applying a second operator $$G_y = \begin{bmatrix} +1 & +2 & +1 \\ 0 & 0 & 0 \\ -1 & -2 & -1 \end{bmatrix}$$

to the pixel values of the first frame in a y-direction; and determining a first gradient image of the first frame, wherein pixel values G of the gradient image are determined using $$G = \sqrt{G_x^2 + G_y^2},$$

wherein the determining the set of matching block pairs comprises matching each block of pixels of the first gradient image of the first frame with a corresponding block of pixels of a second gradient image of the second frame.

3. The method of claim 1, further comprising:
receiving, from the camera, a third frame of video data representing the physical environment, wherein the third frame is consecutive to the second frame;

receiving, from the camera, a fourth frame of the video data, wherein the fourth frame is consecutive to the third frame;

dividing the third frame into a third plurality of blocks of pixels;

dividing the fourth frame into a fourth plurality of blocks of pixels;

determining a second set of matching block pairs by matching each block of pixels of the second plurality of blocks of pixels with a corresponding block of pixels of the third plurality of blocks of pixels;

determining a third set of matching block pairs by matching each block of pixels of the third plurality of blocks of pixels with a corresponding block of pixels of the fourth plurality of blocks of pixels;

for each matching block pair of the second set of matching block pairs, determining a second SSD of the matching block pair;

for each matching block pair of the third set of matching block pairs, determining a third SSD of the matching block pair;

determining a second mean SSD value for the second set of matching block pairs;

determining a third mean SSD value for the third set of matching block pairs; and wherein determining the first convolution of the first mean SSD value with the kernel K, further comprises determining:

$$\sum_{i=1}^{3} K[i] \times f[t+i],$$

wherein, for i=1, f[t+i] is first mean SSD value, for i=2, f[t+i] is the second mean SSD value, and for i=3, f[t+i] is the third mean SSD value.

4. The method of claim 1, further comprising:
receiving, from the camera, a third frame of video data representing the physical environment;

receiving, from the camera, a fourth frame of the video data, wherein the fourth frame is consecutive to the third frame;

dividing the third frame into a third plurality of blocks of pixels;

dividing the fourth frame into a fourth plurality of blocks of pixels;

determining a second set of matching block pairs by matching each block of pixels of the third plurality of blocks of pixels with a corresponding block of pixels of the fourth plurality of blocks of pixels, wherein each matching block pair of the second set of matching block pairs represents a second same region of the physical environment;

for each matching block pair of the second set of matching block pairs, determining a second SSD of the matching block pair to generate SSD values of the second set of matching block pairs;

determining a second mean SSD value for the second set of matching block pairs;

determining a second standard deviation of the second SSD values of the second set of matching block pairs;

determining a third convolution of the second mean SSD value with the kernel K;

determining a fourth convolution of the second standard deviation of the second SSD values with the kernel K;

determining that a third result of the third convolution is less than the mean threshold value or that a fourth result of the fourth convolution is less than the standard deviation convolution threshold value;

determining that second differences in the video data between the third frame and the fourth frame are due to motion in the physical environment; and generating an alert indicating that motion has been detected in the physical environment.

5. A method comprising:

receiving a first frame of video data representing a portion of a physical environment;

receiving a second frame of video data representing the portion of the physical environment;

dividing the first frame into first blocks of pixels;

dividing the second frame into second blocks of pixels;

determining a set of matching block pairs by matching each block of the first blocks of pixels with a corresponding block of the second blocks of pixels;

determining a difference value for each pair of the set of matching block pairs to generate difference values of the set of matching block pairs;

determining a mean difference value of the difference values of the set of matching block pairs;

convolving the mean difference value with a convolution kernel;

determining that a result of the convolving the mean difference value with the convolution kernel exceeds a mean threshold value; and determining that a difference between the first frame and the second frame is not due to motion in the physical environment.

6. The method of claim 5, further comprising:

determining a standard deviation of the difference values;

convolving the standard deviation with the convolution kernel; and determining that a second result of the convolving the standard deviation with the convolution kernel exceeds a standard deviation threshold value.

7. The method of claim 5, further comprising:

generating a first gradient map of the first frame of video data; and generating a second gradient map of the second frame of video data, wherein dividing the first frame into first blocks of pixels comprises dividing the first gradient map of the first frame into the first blocks of pixels, and wherein dividing the second frame into second blocks of pixels comprises dividing the second gradient map of the second frame into the second blocks of pixels.

8. The method of claim 5, wherein determining the difference value for each pair of the set of matching block pairs comprises determining a sum of squared differences (SSD) for each pair of the set of matching block pairs, and wherein the mean difference value is a mean SSD value.

9. The method of claim 5, wherein the convolution kernel is:

$K=[(\alpha-1)/2, \alpha, (\alpha-1)/2]$, where $0<\alpha<1$.

10. The method of claim 5, further comprising:

receiving a third frame of video data representing the portion of the physical environment;

receiving a fourth frame of video data representing the portion of the physical environment;

dividing the third frame into third blocks of pixels;

dividing the fourth frame into fourth blocks of pixels;

determining a second set of matching block pairs by matching each block of the third blocks of pixels with a corresponding block of the fourth blocks of pixels;

determining a second difference value for each of the matching block pairs of the second set of matching blocks to generate second difference values of the second set of matching block pairs;

determining a second mean difference value for the second set of matching block pairs;

convolving the second mean difference value with the convolution kernel;

determining that a second result of the convolving the second mean difference value with the convolution kernel does not exceed the mean threshold value; and generating an alert indicative of motion in the physical environment.

11. The method of claim 10, further comprising:

determining a second standard deviation of the second difference values;

convolving the second standard deviation with the convolution kernel; and determining that a result of the convolving the second standard deviation with the convolution kernel does not exceed a standard deviation threshold value, wherein the generating the alert is further based at least in part on the result of the convolving the second standard deviation with the convolution kernel not exceeding the standard deviation threshold value.

12. The method of claim 10, further comprising:

sending the third frame of video data and the fourth frame of video data to a motion detection module or a human detection module, based at least in part on the determining that the second result of the convolving the second mean difference value with the convolution kernel does not exceed the mean threshold value.

13. A computing device comprising:

at least one processor; and a memory configured in communication with the at least one processor, the memory storing instructions that, when executed by the at least one processor cause the at least one processor to perform a method comprising:

receiving a first frame of video data representing a portion of a physical environment;

receiving a second frame of video data representing the portion of the physical environment;

dividing the first frame into first blocks of pixels;

dividing the second frame into second blocks of pixels;

determining a set of matching block pairs by matching each block of the first blocks of pixels with a corresponding block of the second blocks of pixels;

determining a difference value for each of the matching block pairs to generate difference values of the set of matching block pairs;

determining a mean difference value of the difference values of the set of the matching block pairs;

convolving the mean difference value with a convolution kernel;

determining that a result of the convolving the mean difference value with the convolution kernel exceeds a mean threshold value; and determining that a difference between the first frame and the second frame is not due to motion in the physical environment.

14. The computing device of claim 13, wherein the instructions, when executed by the at least one processor are effective to cause the at least one processor to perform the method further comprising:

determining a standard deviation of the difference values;

convolving the standard deviation with the convolution kernel; and determining that a second result of the convolving the standard deviation with the convolution kernel exceeds a standard deviation threshold value.

15. The computing device of claim 13, wherein the instructions, when executed by the at least one processor are effective to cause the at least one processor to perform the method further comprising:

generating a first gradient map of the first frame of video data; and generating a second gradient map of the second frame of video data, wherein dividing the first frame into first blocks of pixels comprises dividing the first gradient map of the first frame into the first blocks of pixels, and wherein dividing the second frame into second blocks of pixels comprises dividing the second gradient map of the second frame into the second blocks of pixels.

16. The computing device of claim 13, wherein the determining a difference value for each pair of the set of matching block pairs comprises determining a sum of squared differences (SSD) for each pair of the set of matching block pairs, and wherein the mean difference value is a mean SSD value.

17. The computing device of claim 13, wherein the convolution kernel is:

$$K=[(\alpha-1)/2,\alpha,(\alpha-1)/2], \text{ where } 0<\alpha<1.$$

18. The computing device of claim 13, wherein the instructions, when executed by the at least one processor are effective to cause the at least one processor to perform the method further comprising:

receiving a third frame of video data representing the portion of the physical environment;

receiving a fourth frame of video data representing the portion of the physical environment;

dividing the third frame into third blocks of pixels;

dividing the fourth frame into fourth blocks of pixels;

determining a second set of matching block pairs by matching each block of the third blocks of pixels with a corresponding block of the fourth blocks of pixels;

determining a second difference value for each of the matching block pairs of the second set of matching blocks to generate second difference values of the second set of matching block pairs;

determining a second mean difference value for the second set of matching block pairs;

convolving the second mean difference value with the convolution kernel;

determining that a second result of the convolving the second mean difference value with the convolution kernel does not exceed the mean threshold value; and generating an alert indicative of motion in the physical environment.

19. The computing device of claim 18, wherein the instructions, when executed by the at least one processor are effective to cause the at least one processor to perform the method further comprising:

determining a second standard deviation of the second difference values;

convolving the second standard deviation with the convolution kernel; and determining that a result of the convolving the standard deviation with the convolution kernel does not exceed a standard deviation threshold value, wherein the generating the alert is further based at least in part on the result of the convolving the second standard deviation with the convolution kernel not exceeding the standard deviation threshold value.

20. The computing device of claim 18, wherein the instructions, when executed by the at least one processor are effective to cause the at least one processor to perform the method further comprising:

sending the third frame of video data and the fourth frame of video data to a motion detection module or a human detection module, based at least in part on the determining that the second result of the convolving the second mean difference value with the convolution kernel does not exceed the mean threshold value.

* * * * *

UNITED STATES PATENT AND TRADEMARK OFFICE
CERTIFICATE OF CORRECTION

PATENT NO. : 10,255,683 B1  
APPLICATION NO. : 15/799517  
DATED : April 9, 2019  
INVENTOR(S) : Sharath Kumar Gopal and Rohith Mysore Vijaya Kumar Page 1 of 1

It is certified that error appears in the above-identified patent and that said Letters Patent is hereby corrected as shown below:

In the Claims

Claim 3, Column 20, Line 52, replace "for 1=2" with "for i=2"

Signed and Sealed this  
Sixth Day of August, 2019

Andrei Iancu  
*Director of the United States Patent and Trademark Office*